Jan. 21, 1941.    G. P. ANDERSON ET AL    2,229,031
COFFEE GRINDER
Filed Dec. 28, 1937    2 Sheets-Sheet 1

INVENTORS
GEORGE P. ANDERSON
DOUGLAS G. ANDERSON
BY
ATTORNEYS

Jan. 21, 1941.     G. P. ANDERSON ET AL     2,229,031
COFFEE GRINDER
Filed Dec. 28, 1937     2 Sheets-Sheet 2

INVENTORS
GEORGE P. ANDERSON
DOUGLAS G. ANDERSON
BY
ATTORNEYS

Patented Jan. 21, 1941

2,229,031

UNITED STATES PATENT OFFICE 2,229,031

COFFEE GRINDER

George P. Anderson and Douglas G. Anderson, Detroit, Mich., assignor to The Standard Computing Scale Company, Detroit, Mich., a corporation of Michigan Application December 28, 1937, Serial No. 182,107

4 Claims. (Cl. 83—18)

The present invention relates to grinders for coffee and similar materials and specifically to grinders of the kind commonly used by grocers to grind coffee to the requirements of individual customers.

Among the objects of the invention is a grinder which will be more compact and thereby require less counter space than those in common use.

Another object is to improve the appearance of such devices by repositioning the elements into a vertically aligned concentric arrangement.

Another object is to decrease the cost of construction, while at the same time increase the ease of assembly, the efficiency and reliability of operation.

Other objects and advantages will be apparent to those skilled in the art upon reference to the following description and the accompanying drawings, in which Figure 1 is a view in elevation of the grinder.

Figure 2:
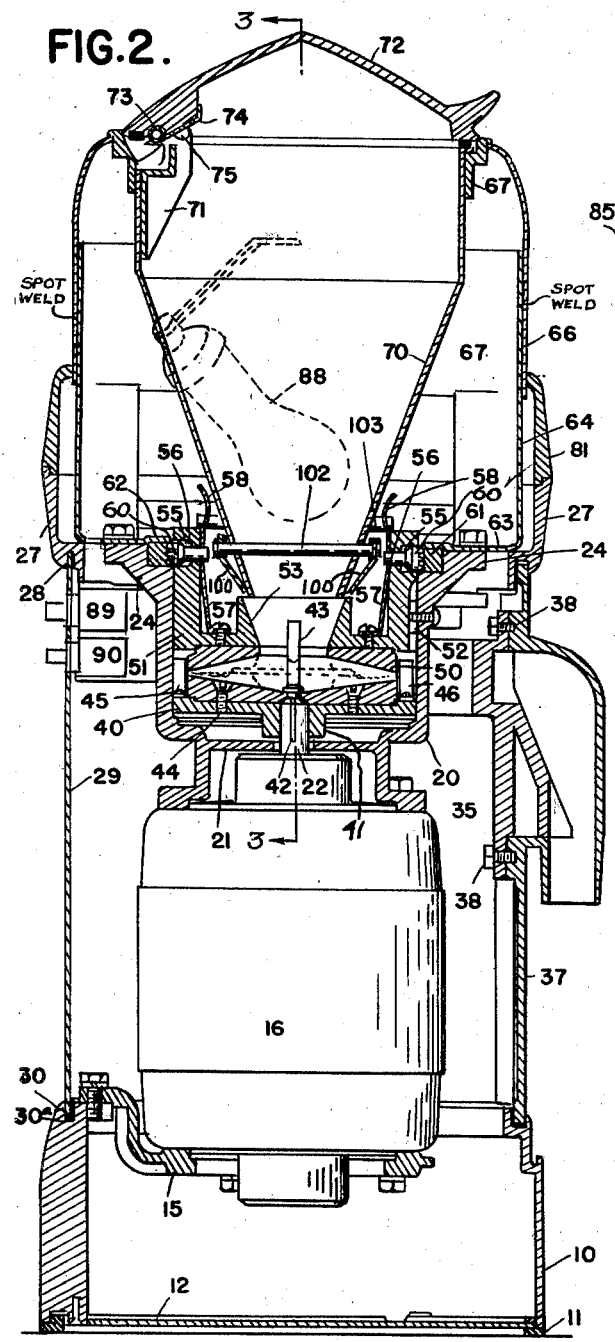
Figure 2 is a vertical section on line 2—2 of Figure 4.
Figure 1:
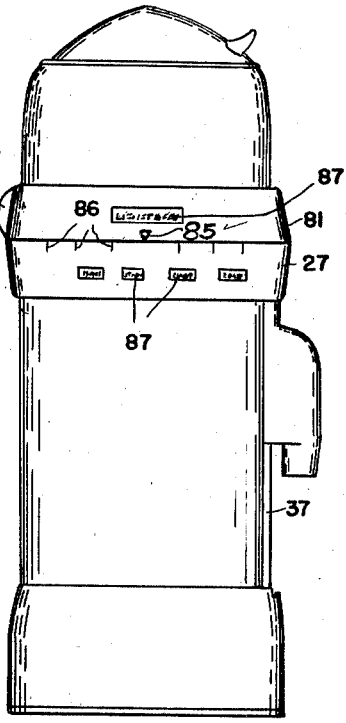

As indicated in the drawings, the grinder comprises a circular base member 10 adapted to rest upon a resilient ring 11 of preferably rubber, and which may be supplied with a sheet metal closure plate 12. Mounted upon the base 10 and fixed thereto is a spider 15 serving to support a vertically arranged electric motor 16, the latter being fixed to the spider.

Figure 5:
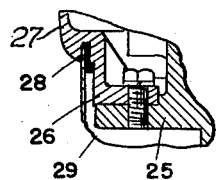
Figure 5 is a sectional view on line 5—5 of Figure 4.

The upper end of the motor housing is provided with a suitable seat upon which is fixed a casting 20. This casting is generally cylindrical and provided with a horizontal partition 21 near its lower end, which partition is, however, apertured centrally to allow the motor shaft 22 to project up into the cup so formed. The member 20 extends well up above the motor 16 and is provided as at 24 with a thick flange and at a somewhat lower level with a plurality of outwardly extending lugs 25 (these being shown best in Figs. 4 and 5). Fixed, by means of suitable feet 26, upon lugs 25 is a ring member 27 and this is preferably grooved around its lower edge portion as at 28 to receive and hold in place the upper edge of a cylindrical housing 29, the lower edge being received in a similar groove 30 in base member 10, a suitable gasket 30a being provided.

Figure 4:
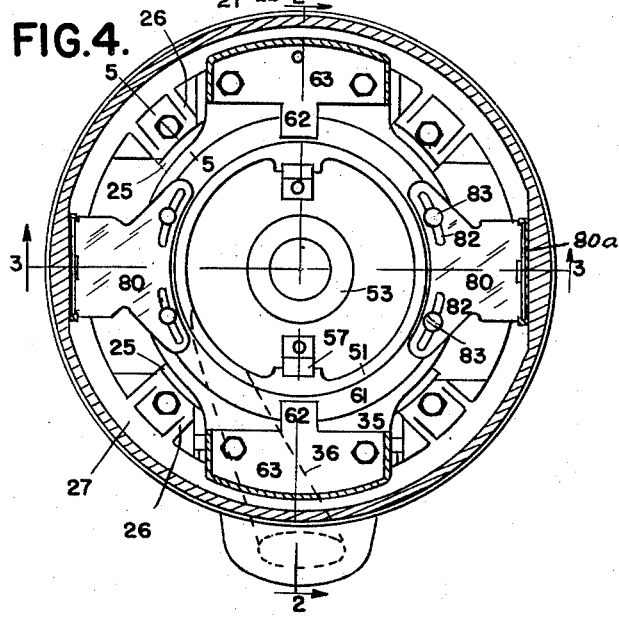
Figure 4 is a horizontal section on line 4—4 of Figure 3.

As indicated in Figures 2 and 4, the member 20 is also provided with a lateral extension 35 provided with a passageway 36 opening tangentially to the inside of the cupped member 20. This passageway 36 leads as indicated from the cup of member 20 to a point near the line of housing 29 and is continued into a vertical moulding and spout member 37 which extends from the base 10 to ring member 27 and is held thereby in the same fashion as housing 29 being also fixed to extension 35 as by screws 38. The moulding also serves to span the space between the vertical edges of housing 29.

Figure 3:
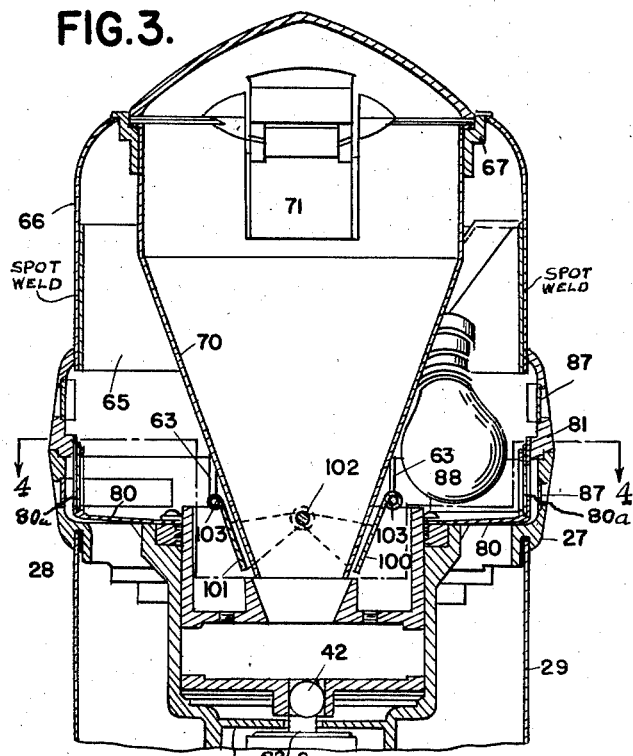
Figure 3 is a vertical part section on line 3—3 of Figure 4.

Mounted upon the portion of shaft 22 which projects above partition 21 in the cupped member 20 is a rotatable plate 40 provided with a hub portion 41 keyed to the shaft 22 by a comparatively soft metal key 42, shown in Figure 3 as a disc, and above the plate and secured thereto is an upwardly extending flattened agitator member 43, serving, when the grinder is in use, to prevent bridging of the incoming material.

Fixed to the plate 40 as by screws 44 is a burr plate 45 constituting the lower burr of the pair, and around the periphery of this burr 45 upon the extending edge of plate 40 may be mounted radially arranged vanes 46. The upper and stationary burr 50 is fixed to the bottom of a cup 51 slidable in the cupped member 20 and prevented from rotation by means of a key 52 fixed to the inner wall of the latter. This cup 51 has a central opening in its bottom surrounded by a hopper portion 53 and the burr 50 is provided with a similar central opening registering therewith.

Near the upper edge of cup 51 and in the outer surface thereof are provided a plurality of recesses 5 having openings into the interior of the cup and seated in said recesses are short plugs 56 whose stems extend through the openings into the cup and are fixed to spring members 57 conveniently secured to the inside bottom of the cup and extending sufficiently above the upper edge of the latter to provide handle portions 58.

The head portions 60 of plugs 56 are of such size as to extend beyond the periphery of the cup 51 when thrust outwardly by the springs 57 and on their outer faces are provided with substantially parallel ridges formed and arranged to constitute portions of screw threads adapted to coact with corresponding screw threads formed upon the inner periphery of a rotatable ring 61. This ring is seated upon a suitable shoulder formed in the thick flanged upper edge 24 of member 20 and is maintained in place upon the shoulder by tongues 62 extending thereover from foot portions 63 of a sheet metal cup 64 forming part of the superstructure suporting the feed hopper.

Figure 6:
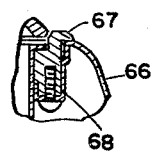
Figure 6 is a sectional view showing a portion of the top construction.

This superstructure comprises the cup 64 which is largely cut away at diametrically opposite portions of its bottom except for the foot portions 63, but leaving a ring portion 65 at its upper end, to which is secured as by spot-welding or in any other suitable fashion, a sheet metal outer cover 66, the upper end of which curves inwardly to support a moulding 67, conveniently secured in place as by clips 68 (see Fig. 6).

As shown best in Figures 2, 3 and 6, the moulding 67 is provide on its inner periphery with a ledge serving to support a feed hopper 70, the latter being flanged adjacent its upper edge to cooperate with said ledge. Also fixed to the hopper 70 is one leaf 71 of a hinge serving to mount a lid 72 upon the hopper and removable as a unit therewith. The pintle 73 of the hinge is conveniently fixed to the lid as by means of a clip member 74, itself fixed to the lid by screws 75.

As indicated above, adjustment of the burrs 45 and 50 to determine the fineness of grinding is accomplished by rotating the threaded ring 61, the threads thereon coacting with the threaded plugs 56 to move cup 51 and burr 50 nearer to or farther from the rotating burr, 45. This rotation of ring 61 is accomplished by securing thereto arms 80 which extend outwardly and upwardly and are fixed to a ring 81 located around the outside of cup 65 and cover member 66. It is preferred also to arrange ring 81 so as to abut and slide upon the upper edge of the stationary ring 27. It is also preferred to slot the arms 80 as at 82 to provide for circumferential adjustment when securing them to the ring 61 as by screws 83.

The amount of rotation of ring 81 and consequently the fineness of grinding is suitably indicated by a pointer 85 preferably on ring 81 and both rings 27 and 81 may be provided with windows 87 which may be illuminated by one or more suitable electric lights 88 mounted in the space around hopper 70 and controlled by a switch 89. The switch 89 may control the motor 16.

As indicated by the lettering on the windows 87, suitable words may be displayed to indicate the fineness of the grinding, for example, "Coarse boiling," "Drip pot," "Vacuum pot," etc.

And it is preferred to arrange on the arms 80 in suitable position, colored screens 80a which will be moved behind the windows indicating the particular grind when the ring 81 is moved to adjust the burrs.

Since it sometimes happens that it is desirable to remove the hopper 70 from the machine with material, for example, coffee therein, means is also provided for opening and closing the lower end thereof. Such means is shown in Figures 2 and 3. In these figures a pair of closure plates 100 and 101 are shown swingably mounted upon the ends of a shaft 102 traversing the lower portion of the hopper. Each of the plates 100 and 101 carries at its outer edge a horizontally arranged rod 103 of sufficient length to strike the edges of cup 51 when the hopper 70 is lowered into place, the plates dropping down to cover the lower end of the hopper when the latter is lifted out.

It should be noted that the cup member 51 and feed throat 53 are so proportioned that when the hopper 70 is removed this cup member will catch and retain any small spillage occurring during the closing of the plates 100 and 101.

Figure 7:
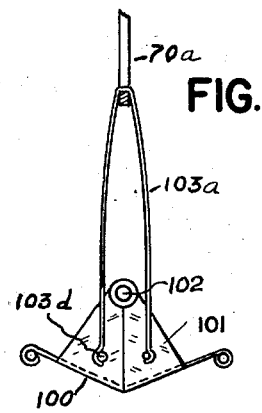

In order to assist the closing of the gate 100—101, a spring such as shown at 103a may be used. This spring as shown best in Figure 7, may be of hair-pin shape and have its ends hooked, as at 103d, around suitable projections on the gate members 100 and 101 with the upper end lying along the wall of hopper 70, preferably maintained in position by a suitable slide 70a fixed to the hopper.

The operation of the grinder seems quite obvious from the construction but it should be noted that burr changing is accomplished without other tools than a screw driver, by removing the hopper 70, then, by drawing together the springs 57, the threaded plugs 56 are disengaged from the ring 61 and the cup 51 readily lifted out.

The grinding is of course facilitated by the rapid removal of the ground material by the vanes 46, which act as fan blades to blow out as well as throw out mechanically the ground material. Incidentally the blowing action tends to create a movement of air up around the plate 40 and thus decreases the possibility of fine material dropping past the plate onto the motor.

What we claim is:

1. Adjusting means for burr plates of grinding devices, said means consisting of a longitudinally movable carrier for one of said plates, said carrier having radially movable threaded portions, a ring member concentric with said carrier and provided with internal threads adapted to coact with said threaded portions, means for mounting said ring member to permit rotation thereof while preventing axial movement and means for radially moving said threaded portions away from said ring whereby to enable quick removal of said carrier.

2. In a grinder having burr plates, adjusting means for said plates consisting of a longitudinally movable carrier for one of said plates, said carrier having radially movable threaded portions, a ring member concentric with said carrier and provided with internal threads adapted to coact with said threaded portions, means for radially moving said threaded portions away from said ring whereby to enable quick removal of said carrier, and means for mounting said ring member to permit rotation thereof while preventing axial movement, a housing for said parts and means extending outside of said housing for rotating said ring member.

3. A grinder according to claim 2 in which the housing is circular and in which the means for rotating the said ring member includes an outer ring surrounding said housing.

4. In a grinding machine, a motor provided with a shaft, a cupped member provided with a freely rotatable internally threaded ring carried in its inner walls, the said shaft extending into the cupped member and having a rotary burr plate fixed to said shaft within said member, a second member telescoping within the first and having fixed thereto a burr plate adapted to cooperate with the first mentioned burr plate, means for fixing the second member and burr plate against rotation, threaded means carried by said second member and arranged to coact with said internally threaded ring, means for feeding material into the space between said burr plates, means for leading out of said cupped member ground material coming from the periphery of said plates, and means to rotate said ring whereby to adjust the relative position of said members and thereby of said burr plates.

GEORGE P. ANDERSON.
DOUGLAS G. ANDERSON.